United States Patent Office 3,150,102
Patented Sept. 22, 1964

---

3,150,102
DEMULSIFICATION OF CRUDE OIL-IN-WA-
TER EMULSIONS AND CHEMICALS USE-
FUL THEREIN
Willard H. Kirkpatrick, Sugar Land, and Virgil L. Seale
and Alice Walker Church, Houston, Tex., assignors to
Nalco Chemical Company, a corporation of Delaware
No Drawing. Filed Aug. 16, 1960, Ser. No. 49,845
10 Claims. (Cl. 252—344)

This invention, in general, relates to a demulsification of crude oil-in-water emulsions, which are commonly known in the petroleum industry as reversed emulsions.

Oil recovered from subterranean formations often contains minor proportions of water. The oil and water often forms stable emulsions, the most common of which is a water-in-oil emulsion wherein the oil is the continuous phase of the emulsion and the water the disposed phase. In other cases, however, where relatively large quantities of water are recovered with the oil, the phases of the emulsion are reversed so that the water forms the continuous phase and the oil the dispersed phase. This type of oil-in-water emulsion may be very stable and may require treatment with demulsification chemicals in order to separate the oil and water into separate components. These oil-in-water emulsions are different from water-in-oil emulsions, and treatments used to demulsify water-in-oil emulsions are, in general, not effective to demulsify oil-in-water emulsions.

The demulsification of reversed emulsions can be achieved by the addition to the emulsions of a chemical which alters the surface tension at the liquid interface between the dispersed droplets of oil and the water phase in a manner to cause the emulsion to break. When the emulsion breaks, the oil and water separate into two layers.

The present invention is concerned with the breaking of or demulsification of oil-in-water emulsions by the treatment of these emulsions with chemicals which we have found to be especially suitable for this purpose. The invention has particular application to the breaking of or demulsification of petroleum oil-in-water emulsions which occur in petroleum oil which is recovered from subterranean formations. These emulsions may be described as naturally-occurring petroleum oil-in-water emulsions.

It is an object of the present invention to provide improvements in the breaking of or demulsification of water-in-oil emulsions.

A more specific object of the invention is to provide improvements in the chemical treatment of petroleum oil-in-water emulsions to break the emulsions and thereby permit the oil and water components to separate.

A still further object of the invention is to provide new and improved processes for the resolving of petroleum oil-in-water emulsions into separate components of petroleum oil and water.

Another object of the invention is to provide new chemicals which are, or are derived from, condensation products of a phenol, an aldehyde, and a higher polyalkylene polyamine. Other objects will appear hereinafter.

Briefly, the process portion of the present invention relates to the demulsification of reversed emulsions with one of (a) condensates of a phenol, an aldehyde and higher polyalkylene polyamines, (b) salts thereof with water-soluble organic and inorganic acids, (c) reaction products of said condensates with lower alkylene dihalides and (d) reaction products of said condensates with epihalohydrins. Each of these products is soluble in water, which is a polar solvent, or in a mixture of 30–95% water and 5–70% of a polar organic liquid miscible with water, such as lower alkanols and the like.

The reaction products of the phenols, aldehydes and higher polyalkylene polyamines are prepared by heating the phenol, aldehyde and polyalkylene polyamine until there is a condensation of the phenol, aldehyde and polyamine. In this condensation water produced by the condensation reaction is driven off in the form of an aqueous distillate. The molar ratio of reactants and the time of reaction, measured in terms of the amount of water of reaction driven off, are carefully controlled so that the product is soluble or dispersible in water or a mixture of water and a water-miscible polar organic liquid of the type described. It is possible, however, to carry the condensation to a point where a water insoluble product results if this product can be rendered water soluble by forming a salt with a water-soluble organic or inorganic acid or by reacting the condensate with a lower alkylene dihalide or an epihalohydrin. The average molecular weight of the condensate is at least about 1000.

The phenols used in this invention are phenol itself or lower alkyl-substituted phenols, preferably substituted with 1–2 lower alkyl groups of 1–6 carbons, one of which groups is preferably in the ortho- or para-positions. The alkyl groups should be relatively short because long chain alkyl groups promote water-insolubility. Phenol or a phenol with alky groups having 1–4 carbons are preferred. Mixtures of phenols whose phenolic components have different 1–4 carbon alkyl groups are useful in the practice of the invention.

The aldehyde reactant is a monoaldehyde of 1–4 carbons, including formaldehyde, acetaldehyde, n-propaldehyde, n-butyraldehyde and the like. Low molecular weight polymers of formaldehyde which break down into formaldehyde under reaction conditions, e.g., paraformaldehyde, may also be used and are considered for purposes of this invention to be the equivalent of formaldehyde. Formalin, an aqueous solution of formaldehyde, may also be employed, but it has less advantage than other forms of formaldehyde because the water of solution must be driven off to obtain the desired condensation reaction.

The higher polyalkylene polyamines of the present invention are polyalkylene, e.g., polyethylene or polypropylene polyamines having more than five amino groups or mixtures having an average of more than five amino groups. This number of amino groups in the polyamine reactant is essential for our purposes. Examples of such amines are pentaethylene hexamine, hexaethylene heptamine and higher homologs thereof of the generalized formula:

$$H_2N(RNH)_xH$$

where R is an alkylene group of 2–3 carbons, e.g.,

, 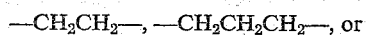

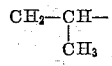

and $x$ is in the order of more than 4, up to a maximum of about 12. Mixtures of polyalkylene polyamines having an average of more than five amino groups are also useful in the present invention and often constitute the most economical source for this raw material. For example, the still residue from the production of tetraethylene pentamine, consisting primarily of polyalkylene polyamines higher than five ethyleneamine units, is commercially available. Also, a similar product, consisting of about 40% tetraethylene pentamine and about 60% higher polyalkylene polyamine homologs, is commercially available.

The control of the condensation reaction of the phenol, aldehyde, and higher polyalkylene polyamine for producing a water-dispersible or water-soluble product in accordance with the present invention is achieved by regulating the molar proportions of the reactants, the time of reaction, primarily as it relates to the amount of water of reaction distilled off, or both. In general, the molar ratio of the polyamine to phenol will lie in the range of 0.5–2.0 mols of the polyamine per mol of the phenol. The quantity of the aldehyde, essentially, governs the degree of condensation, and the products produced in accordance with this invention may vary from substantially linear polymer condensates to significantly cross-linked polymers. Cross-linking, however, is to be controlled to the degree that a water-insoluble or water-indispersible product, either the condensate or the reaction product thereof or the salt thereof as herein described, is avoided. The amount of the aldehyde reacted in the condensation reaction with the phenol and the polyamine will ordinarily be equal to, on a molar basis, a minimum of about 0.8 of the total mols of the phenol and the polyamine up to a maximum of about twice the total mols of the phenol and the polyamine. The quantity of the aldehyde which is reacted during the condensation reaction can be measured by the amount of water or reaction distilled off during the condensation reaction—one mol of water of reaction being approximately equivalent to one mol of reacted aldehyde. In this equation of reacted aldehyde to water of reaction, any water which is introduced with the reactants must be discounted. The mols of water of reaction distilled off should be in the range of about 0.8–2.0 mols per total mols of the phenol and the higher alkylene polyamine.

In addition to condensates heretofore described, this invention also includes the salts of these condensates, whose free amino groups are basic in nature, with water-soluble organic and inorganic acids. These acids are prepared by mixing the acid with the polyamine-aldehyde-phenol condensates. The salt formation occurs at the amino groups of the condensate. The quantity of acid is at least equal to, on an average, one mol of the acid per mol of the condensate, and may range as high as one mol of the acid for each mol equivalent of free amino groups in the condensate. Examples of acids which are useful in producing the salts in accordance with the invention are sulfuric acid, sulfamic acid, phosphoric acid, hydrochloric acid, hydrobromic acid, acetic acid, propionic acid, glycolic acid, diglycolic acid, citric acid, maleic acid, adipic acid, o-phthalic acid, terephthalic acid, and like monocarboxylic and dicarboxylic acids having one to eight carbons.

This invention also contemplates the reaction products of the previously described condensates of phenol, aldehyde, and higher polyalkylene polyamine with a lower alkylene dihalide such as ethylene dichloride, ethylene dibromide, ethylene diiodide, 1,2- and 1,3-propylene dichloride (or bromide or iodide) and other alkylene dihalides containing 2–4 carbons per alkylene group. The reaction between these two chemicals is conducted at a temperature in the order of 80–100° C. for a period of at least one-half hour. A reaction period more than about two hours is ordinarily not required. The purpose of a reaction with the alkylene dihalide is to achieve additional polymerization in the free amino groups of the condensate and the reactive halogen atoms of the alkylene dihalide. Additional polymerization is evidenced by substantial or significant increase in the viscosity of the reaction product. The ratio of the alkylene dihalide to the condensate, on a molar basis, ordinarily lies within the range of 1–4 mols of the alkylene dihalide per mol of the phenol-aldehyde-polyamine condensate. The resultant product is a polymer composed of phenol-aldehyde-polyamine condensation units of a polymeric nature further cross-linked by alkylene groups reacted at the amino nitrogens of the condensate. Unless neutralized, the product is the acid salt of the halogen acid released by the reaction of the alkylene dihalide with the polymeric condensate. If desired, the acids so released may be neutralized with caustic or like alkali.

The reaction products of epihalohydrins and the phenol-aldehyde-polyamine condensation polymers is carried out under substantially the same conditions and the same ratios of reactants as described above with respect to the reaction of the condensation polymer and alkylene dihalides. The epihalohydrins useful in accordance with the invention may be, for example, epichlorohydrin, epibromohydrin, epiiodohydrin, epidichlorohydrin, epidibromohydrin, epidiiodohydrin, and the like. Epichlorohydrin, like the alkylene dihalides, is a cross-linking agent which links polymer units of the phenol-aldehyde-polyamine condensation polymer by reaction with the free amino groups of the condensation polymer. In this instance, the reaction occurs at the halo group at one end of the molecule and the oxirane or epoxy group at the other end of the epihalohydrin molecule. The cross-linking radical is believed to be a n-propylene group having a hydroxy group on the middle carbon. The epihalohydrins release only half the quantity of halogen acids in the cross-linking reaction as the alkylene dihalides, which acids form a salt with the basic groups in the reaction product unless neutralized in the manner aforesaid.

Our invention is further illustrated in the examples following, wherein all parts are expressed in terms by weight unless otherwise indicated.

Example I

Four hundred fifty parts of the still residue from production of tetraethylene pentamine, consisting primarily of a mixture of polyethylene polyamines higher than five ethylene amine units, e.g., about 6 to 9 or 10 units, 150 parts of an alkyl phenol consisting essentially of a mixture of 70% para-ethyl phenol and 30% para-isopropyl phenol, and 100 parts of water were placed in a three-necked reaction vessel fitted with a thermometer, a means of agitation and a condenser and trap for the removal of any aqueous material. To this mixture a total of 113 parts of para-formaldehyde was added at temperatures below 90° C. When the addition of the paraformaldehyde was complete the temperature was slowly raised to remove a total of 161 parts of aqueous distillate with a final temperature of 186° C. The process of the aqueous distillate removal required three hours and fifteen minutes.

Example II

Into a three-necked vessel fitted with a thermometer, a means of agitation and a condenser and trap for collecting the aqueous distillate involved, there were charged the following materials: 360 parts of the still residue from production of tetraethylene pentamine described in the previous example, and 120 parts of the alkyl phenol mixture described in the previous example. To these materials there was added a total of 200 parts of n-butyraldehyde at a temperature below 90° C. After addition of the n-butyraldehyde was completed the temperature was slowly raised to remove a total of 50 parts of aqueous distillate with a final temperature of 186° C. The aqueous distillate removal required four hours and fifty minutes.

Example III

In the manner described in Example I, 600 parts of the still residue from production of tetraethylene pentamine described in the first intermediate example (consisting primarily of polyalkylene polyamines higher than five ethylene amine units), 150 parts of the alkyl phenol mixture disclosed in the foregoing Example I and 100 parts of water were charged to a three-necked flask. To this mixture there was added a total of 75 parts of paraformaldehyde at temperatures below 90° C. When the paraformaldehyde addition was completed, the temperature was slowly raised to remove a total of 130 parts of aqueous distillate at the final temperature of 181° C. The aqueous distillate removal required approximately three hours and thirty minutes in this case.

Example IV

Three hundred parts of a mixture consisting of 40% tetraethylene pentamine with the remaining 60% being higher polyalkylene polyamine homologs having about 6–10 amino groups and 100 parts of 92% phenol were charged to a three-necked flask as described in Example I. One hundred parts of paraformaldehyde was added at temperatures below 100° C. After the addition of paraformaldehyde was completed the temperature was then raised to remove aqueous distillate in the amount of 70 parts at a final temperature of 168° C. The material was cooled to 100° C. and 300 parts of water, and 100 parts of isopropyl alcohol were added. The material was stirred to uniformity.

*Example V*

In a manner described in Example I there is charged to a three-necked flask 300 parts of a polyamine mixture consisting of 40% tripropylenetetramine and 60% higher polypropylene polyamine homologs up to about 10 amino groups plus 100 parts 92% phenol. To these materials was added, slowly at temperatures below 100° C., 100 parts paraformaldehyde. When the paraformaldehyde addition was completed, the temperature was slowly raised to remove a total of 70 parts of aqueous distillate with a maximum temperature of 168° C. The material was then cooled to 100° C. At this point 300 parts of water and 100 parts isopropanol was added and the product stirred to uniformity. This product was found to be not completely water-soluble in its basic form.

These examples are illustrative of compositions which are finished products ready for use as reversed emulsion breakers.

*Example VI*

To 100 parts by volume of Example I there was added 150 parts by volume of water and 65 parts by volume of methanol. These materials were stirred to uniformity to give the finished reversed emulsion breaker.

*Example VII*

To 50 parts by volume of Example I there was added 5 parts by volume of 85% orthophosphoric acid. These materials were stirred to uniformity to give the finished reversed emulsion breaker.

*Example VIII*

The product from Example II was further diluted in the same manner as indicated in the description of Example VI. The material in its basic form was not completely water-soluble. This product was converted to the phosphoric acid salt as described in Example VII to provide the finished product in the phosphoric acid salt form.

*Example IX*

The diluted basic material as used in Example VIII was converted to the acetic acid salt by mixing with 8 parts of 40% acetic acid.

*Example X*

For purposes of field use, 25 parts by volume of Example III was further diluted with 21 parts by volume of methanol and 48 parts by volume of water in order to yield an easily handled fluid product

*Example XI*

For purposes of field use, 50 parts by volume of Example IV was further adjusted with 50 parts by volume of water to give the finished reversed emulsion breaker.

*Example XII*

The phosphoric acid salt of Example V is prepared in a manner as described in Example VII.

*Example XIII*

The acetic acid salt of Example V is prepared in a manner as described in Example IX.

*Example XIV*

One hundred fifty parts of the intermediate described under Example III, 50 parts water, and 25 parts of ethylenedichloride were charged to a three-necked flask as described in Example I. The temperature of this mixture was slowly raised until an exothermic reaction was initiated at approximately 95° C. The material was then heated in the range of 95–100° C. for an additional period of 30 minutes at which point the reaction mass exhibited a very definite viscosity increase. The source of external heat was removed at this point and the above product was blended for purposes of field testing with 900 parts of water.

*Example XV*

In a manner as described in Example I, there were charged to a three-necked flask, 300 parts of a polyamine mixture consisting of tripropylene tetramine and higher polypropylene polyamine homologs having up to about 10 amino groups with 100 parts of 92% aqueous phenol. To these materials there was added slowly at temperatures below 100° C., 100 parts of paraformaldehyde. When the paraformaldehyde addition was completed, the temperature was slowly raised to remove a total of 70 parts by volume of aqueous distillate with a maximum temperature of 168° C. The material was then cooled to 100° C. At this temperature, 100 parts by volume of water were added and 100 parts by volume of epichlorohydrin were added drop-wise at such a rate as to maintain the reaction temperature between 90–100° C. After the addition of the epichlorohydrin was completed the material was heated further for a period of one hour at 90–100° C. To this reaction mass there was added 1500 parts by volume of water to yield the finished product.

An oil-in-water emulsion recovered from a petroleum lease is demulsified with a chemical of any one of Examples VI through XV at atmospheric temperature by dispersing the demulsifier in the emulsion at a ratio of active demulsifying chemical to emulsion in the order of 500–1000 p.p.m., by way of example, and allowing the emulsion to stand. The emulsion breaks and the water and oil phases separate.

In a combined chemical-heat treatment, the demulsifying chemical is dispersed in the emulsion as above, and the emulsion is heated in a heater-treater to a temperature, by way of example, of 140–150° F. The heating assists in separation of the oil and water phases.

The chemical treatments of petroleum oil-in-water emulsions in accordance with our invention may be carried out at atmospheric temperature or with heating of the emulsion to temperatures ordinarily not higher than 180° F. The preferred treating temperature is in the range of 80 to 180° F. The ratio of the active demulsifying chemical to the emulsion on a weight basis usually will be within the range of 10 to 2000 parts per million parts of the emulsion. Optimum temperatures and amounts of treating chemical for a particular emulsion may be determined by preliminary laboratory routine.

The invention is hereby claimed as follows:

1. A process for resolving a petroleum oil-in-water emulsion into its component parts which comprises dispersing in said oil-in-water emulsion an emulsion breaking quantity of a polymeric condensate, which has a molecular weight of at least about 1000 and is soluble in a member selected from the group consisting of water and a mixture of 30–95% water and 5–70% of a polar organic liquid miscible with water, and which comprises a phenol selected from the group consisting of phenol, monoalkyl phenols with 1–6 carbon alkyl groups, and dialkyl phenols with 1–6 carbon alkyl groups and a polyalkylene polyamine mixture of polyalkylene polyamines with alkylene groups of 2–3 carbon atoms and having an average number of amino groups per molecule greater than 5 condensed by a lower aliphatic monoaldehyde, wherein the mol ratio of said polyamine to said phenol is 0.5–2:1 and the molar ratio of said aldehyde to the total mols of said phenol and said polyamine is about 0.8–2:1, and separating the resolved oil and water phases of said emulsion.

2. A process as claimed in claim 1 wherein said polymeric condensate is dispersed in said emulsion in the form of a solution of said polymeric condensate in a polar solvent medium containing at least 30% water.

3. A process for resolving a petroleum oil-in-water emulsion into its component parts which comprises dispersing in said oil-in-water emulsion an emulsion breaking quantity of a salt of a water-soluble organic acid and a polymeric condensate, which salt is soluble in a member selected from the group consisting of water and a mixture of 30–95% water and 5–70% of a polar organic liquid miscible with water, and which polymeric condensate has a molecular weight of at least about 1000 and comprises a phenol selected from the group consisting of phenol, monoalkyl phenols with 1–6 carbon alkyl groups, and dialkyl phenols with 1–6 carbon alkyl groups and a polyalkylene polyamine mixture of polyalkylene polyamines with alkylene groups of 2–3 carbon atoms and having an average number of amino groups per molecule greater than 5 condensed by a lower aliphatic monoaldehyde, wherein the mol ratio of said polyamine to said phenol is 0.5–2:1 and the molar ratio of said aldehyde to the total mols of said phenol and said polyamine is about 0.8–2:1 and separataing the resolved oil and water phases of said emulsion.

4. A process as claimed in claim 3 wherein said salt is dispersed in said emulsion in the form of a solution of said salt in a polar solvent medium containing at least 30% water.

5. A process for resolving a petroleum oil-in-water emulsion into its component parts which comprises dispersing in said oil-in-water emulsion an emulsion breaking quantity of a salt of a water-soluble inorganic acid and a polymeric condensate, which salt is soluble in a member selected from the group consisting of water and a mixture of 30–95% water and 5–70% of a polar organic liquid miscible with water, and which polymeric condensate has a molecular weight of at least about 1000 and comprises a phenol selected from the group consisting of phenol, monoalkyl phenols with 1–6 carbon alkyl groups, and dialkyl phenols with 1–6 carbon alkyl groups and a polyalkylene polyamine mixture of polyalkylene polyamines with alkylene groups of 2–3 carbon atoms and having an average number of amino groups per molecule greater than 5 condensed by a lower aliphatic monoaldehyde, wherein the mol ratio of said polyamine to said phenol is 0.5–2:1 and the molar ratio of said aldehyde to the total mols of said phenol and said polyamine is about 0.8–2:1 and separating the resolved oil and water phases of said emulsion.

6. A process as claimed in claim 5 wherein said salt is dispersed in said emulsion in the form of a solution of said salt in a polar solvent medium containing at least 30% water.

7. A process for resolving a petroleum oil-in-water emulsion into its component parts which comprises dispersing in said oil-in-water emulsion an emulsion breaking quantity of a polymeric condensate comprising a phenol selected from the group consisting of phenol, monoalkyl phenols with 1–6 carbon alkyl groups, and dialkyl phenols with 1–6 carbon alkyl groups and a polyalkylene polyamine mixture of polyalkylene polyamines with alkylene groups of 2–3 carbon atoms and having an average number of amino groups per molecule greater than 5 condensed by a lower aliphatic monoaldehyde, wherein the mol ratio of said polyamine to said phenol is 0.5–2:1 and the molar ratio of said aldehyde to the total mols of said phenol and said polyamine is about 0.8–2:1, which phenol-aldehyde-polyalkylene polyamine condensate has a molecular weight of at least about 1000 and is cross-linked by alkylene groups of an alkylene dihalide reacted at the amino nitrogens of said condensate, said cross-linked condensate is soluble in a member selected from the group consisting of water and a mixture of 30–95% water and 5–70% of a polar organic liquid miscible with water and separating the resolved oil and water phases of said emulsion.

8. A process as claimed in claim 7 wherein said cross-linked polymeric condensate is dispersed in said emulsion in the form of a solution of said cross-linked polymeric condensate in a polar solvent medium containing at least 30% water.

9. A process for resolving a petroleum oil-in-water emulsion into its component parts which comprises dispersing in said oil-in-water emulsion an emulsion breaking quantity of a polymeric condensate comprising a phenol selected from the group consisting of phenol, monoalkyl phenols with 1–6 carbon alkyl groups, and dialkyl phenols with 1–6 carbon alkyl groups and a polyalkylene polyamine mixture of polyalkylene polyamines with alkylene groups of 2–3 carbon atoms and having an average number of amino groups per molecule greater than 5 condensed by a lower aliphatic monoaldehyde, wherein the mol ratio of said polyamine to said phenol is 0.5–2:1 and the molar ratio of said aldehyde to the total mols of said phenol and said polyamine is about 0.8–2:1, which phenol-aldehyde-polyalkylene polyamine has a molecular weight of at least about 1000 and is cross-linked with an epihalohydrin, said cross-linked condensate is soluble in a member selected from the group consisting of water and a mixture of 30–95% water and 5–70% of a polar organic liquid miscible with water and separating the resolved oil and water phases of said emulsion.

10. A process as claimed in claim 9 wherein said cross-linked polymeric condensate is dispersed in said emulsion in the form of a solution of said cross-linked polymeric condensate in a polar solvent medium containing at least 30% water.

References Cited in the file of this patent

UNITED STATES PATENTS

| | | |
|---|---|---|
| 2,585,196 | Walton | Feb. 12, 1952 |
| 2,792,366 | De Groote | May 14, 1957 |
| 2,792,372 | Dickson | May 14, 1957 |
| 2,792,373 | Dickson | May 14, 1957 |
| 2,819,223 | De Groote et al. | Jan. 7, 1958 |
| 2,902,458 | Teppema | Sept. 1, 1959 |
| 2,914,484 | Monson et al. | Nov. 24, 1959 |
| 2,981,710 | Hoenel | Apr. 25, 1961 |
| 3,009,884 | Monson et al. | Nov. 21, 1961 |
| 3,060,210 | De Groote et al. | Oct. 23, 1962 |
| 3,098,827 | Kirkpatrick et al. | July 23, 1963 |

UNITED STATES PATENT OFFICE
CERTIFICATE OF CORRECTION

Patent No. 3,150,102                      September 22, 1964

Willard H. Kirkpatrick et al.

It is hereby certified that error appears in the above numbered patent requiring correction and that the said Letters Patent should read as corrected below.

Column 3, line 17, for "or" read -- of --.

Signed and sealed this 26th day of January 1965.

(SEAL)
Attest:

ERNEST W. SWIDER
Attesting Officer

EDWARD J. BRENNER
Commissioner of Patents